US009651137B2

(12) United States Patent
Yoshizawa et al.

(10) Patent No.: US 9,651,137 B2
(45) Date of Patent: May 16, 2017

(54) LUBRICATION STRUCTURE FOR DIFFERENTIAL DEVICE

(71) Applicant: HONDA MOTOR CO., LTD., Tokyo (JP)

(72) Inventors: Masahiro Yoshizawa, Wako (JP); Koichi Fushimi, Wako (JP); Takeo Furuta, Wako (JP); Yuuto Sasaki, Wako (JP); Eri Maeda, Wako (JP); Shinobu Kurachi, Wako (JP); Yuji Koga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 290 days.

(21) Appl. No.: 14/388,714

(22) PCT Filed: Mar. 19, 2013

(86) PCT No.: PCT/JP2013/057915
§ 371 (c)(1),
(2) Date: Sep. 26, 2014

(87) PCT Pub. No.: WO2013/146486
PCT Pub. Date: Oct. 3, 2013

(65) Prior Publication Data
US 2015/0114757 A1 Apr. 30, 2015

(30) Foreign Application Priority Data

Mar. 28, 2012 (JP) .................................. 2012-075240
Jun. 5, 2012 (JP) .................................. 2012-128466

(51) Int. Cl.
*F16H 57/04* (2010.01)
*F16H 48/08* (2006.01)

(52) U.S. Cl.
CPC ..... *F16H 57/0424* (2013.01); *F16H 57/0423* (2013.01); *F16H 57/0428* (2013.01);
(Continued)

(58) Field of Classification Search
CPC ............ F16H 57/0424; F16H 57/0423; F16H 57/0428; F16H 57/0457; F16H 57/0483
(Continued)

(56) References Cited

U.S. PATENT DOCUMENTS 5,161,644 A * 11/1992 Swenskowski ..... F16H 57/0447
180/339
5,505,112 A * 4/1996 Gee .................... F16H 57/0447
180/339
(Continued)

FOREIGN PATENT DOCUMENTS

JP 3-44261 U 4/1991
JP 7-502331 A 3/1995
(Continued)

OTHER PUBLICATIONS

International Search Report dated Jun. 18, 2013 issued in corresponding application No. PCT/JP2013/057915.

*Primary Examiner* — Michael Riegelman
(74) *Attorney, Agent, or Firm* — Westerman, Hattori, Daniels & Adrian, LLP

(57) ABSTRACT

An opening end of an inboard section includes: an end surface composed of a plane positioned farthest from the center of a differential device in the axial direction and perpendicular to the axial direction; a ledge positioned adjacent to the end surface in the circumferential direction of the opening end and closer to the center than the end surface in the axial direction; and a tapered section in a slope shape formed continuing to the inner diameter side of the ledge at the opening end, slanting toward the inner diameter side of (Continued)

the opening end and approaching the center. Lubricating oil supplied to the opening end of the inboard section flows to the tapered section via the ledge and flows from the tapered section into a spiral groove formed on an inner periphery of the inboard section.

10 Claims, 8 Drawing Sheets

(52) U.S. Cl.
CPC ..... F16H 57/0457 (2013.01); F16H 57/0483 (2013.01); *F16H 48/08* (2013.01); *F16H 57/048* (2013.01)

(58) Field of Classification Search
USPC ........................................................ 184/6.12
See application file for complete search history.

(56) References Cited

U.S. PATENT DOCUMENTS

| | | | |
|---|---|---|---|
| 5,542,316 A | 8/1996 | Spooner et al. | |
| 5,557,986 A | 9/1996 | Young et al. | |
| 5,609,073 A | 3/1997 | Spooner et al. | |
| 6,053,835 A | 4/2000 | Shibazaki et al. | |
| 6,413,183 B1 * | 7/2002 | Ishikawa | F16H 48/08 475/160 |
| 6,688,194 B2 * | 2/2004 | Dissett | F16H 48/145 74/650 |
| 7,320,658 B2 * | 1/2008 | Kohno | F16H 48/08 475/160 |
| 8,382,632 B2 * | 2/2013 | Segawa | B23P 15/14 29/893.1 |
| 8,932,172 B2 * | 1/2015 | Tanaka | F16H 48/08 29/893.2 |
| 2003/0232683 A1 * | 12/2003 | Teraoka | F16H 48/22 475/231 |
| 2006/0084546 A1 | 4/2006 | Kohno et al. | |
| 2011/0263372 A1 * | 10/2011 | Kimura | F16H 57/0483 475/160 |

FOREIGN PATENT DOCUMENTS

| | | |
|---|---|---|
| JP | 7-503306 A | 4/1995 |
| JP | 8-500659 A | 1/1996 |
| JP | 8-170718 A | 7/1996 |
| JP | 11-351360 A | 12/1999 |
| JP | 2002-295644 A | 10/2002 |
| JP | 2006-83876 A | 3/2006 |
| JP | 4832980 B2 | 12/2011 |

* cited by examiner

US 9,651,137 B2

LUBRICATION STRUCTURE FOR DIFFERENTIAL DEVICE

TECHNICAL FIELD

The present invention relates to a lubrication structure for lubricating a differential device which is provided by a transmission installed in an automobile.

BACKGROUND ART

A differential device including a differential case rotatably arranged in a transmission case and a final driven gear mounted on this differential case is integrally incorporated into some automotive automatic transmissions (AT) or manual transmissions (MT). The differential device is provided, for the purpose of its lubrication, with a lubrication structure composed to pump up lubricating oil stored in the transmission case using rotation of the final driven gear to be supplied to gears, a rotating shaft, etc.

The above-mentioned lubrication structure is provided with a guide groove for guiding lubricating oil to the inner surface of the transmission case. When lubricating a pinion gear and a pinion shaft in the differential case via an inboard section (or a boss section) of the differential device, the guide groove is adapted to guide lubricating oil into a space between an oil seal and a bearing via such guide groove, thereby lubricating the inside of the differential device.

In this case, as described in Patent Documents 1 and 2, a spiral groove installed on an inner wall of the inboard section of the differential case leads such lubricating oil that has been guided into the space between the oil seal and the bearing into the differential case, using rotating power of the differential case, thereby lubricating a pinion gear, a pinion shaft, a side gear, etc.

RELATED ART DOCUMENTS

Patent Documents

Patent Document 1: JP-B-4832980.
Patent Document 2: JP Hei 8-170718A

DISCLOSURE OF THE INVENTION

Problems to be Solved by the Invention

In a lubrication structure with a spiral groove formed on the inner periphery of an inboard section such as ones described in Patent Documents 1 and 2, lubricating oil outside the inboard section needs to effectively flow from an opening end of the inboard section into the spiral groove. In this regard, in the prior arts described in Patent Documents 1 and 2, an intake port composed of a notched part of the opening end is formed at the position corresponding to an inlet of the spiral groove at the opening end of the inboard section. However, this intake port can intake a limited amount of lubricating oil to the spiral groove. Thus, in these conventional structures, when the final driven gear pumps up lubricating oil, some of the lubricating oil led to the opening end of the inboard section is not supplied to the spiral groove but runs down from the opening end. Therefore, adoption of a structure which can enhance flow rate of lubricating oil flowing into the spiral groove will allow more effective lubrication within the differential device.

In view of the above-described problems, the invention has an object to provide a lubrication structure which can cause lubricating oil to effectively flow into the spiral oil groove from the opening end of the inboard section of the differential case, thereby allowing effective lubrication within the differential device.

Means of Solving the Problems

In order to solve the problems mentioned above, the present invention is directed to a lubrication structure for a differential device. A differential device (1) includes a differential case (30) rotatably arranged in a transmission case (10) and having an inboard section (42) rotatably supporting an axle (38), and a final driven gear (12) installed to the differential case (30). The lubrication structure for the differential device according to this invention includes a bearing (22) rotatably supporting the differential case (30) to the transmission case (10), an oil seal (74) installed between the transmission case (10) and the axle (38), a lubricating oil guide groove (15) formed on the inner surface of the transmission case (10) and communicating between the bearing (22) and the oil seal (74), and a spiral oil groove (80) formed on an inner periphery (42c) of such inboard section (42) from an opening end (42a) of the inboard section (42) toward the center of the differential device (1). And in the lubrication structure for the differential device, lubricating oil which has been pumped up by the final driven gear (12) within the transmission case (10) and then flowed from the lubricating oil guide groove (15) in between the bearing (22) and the oil seal (74) is supplied to the spiral oil groove (80) from the opening end (42a) of the inboard section (42). The opening end (42a) of the inboard section (42) includes an end surface (43) composed of a plane perpendicular to the axial direction at the farthest position from the center in the axial direction, a ledge (44) positioned closer to the center in the axial direction than the end surface (43) and adjacent to the end surface (43) in the circumferential direction of the opening end (42a), a tapered section (45) in a slope shape formed continuing to the ledge (44) on the inner diameter side thereof at the opening end (42a), slanting toward the inner diameter side of the opening end (42a) and approaching the center. Lubricating oil supplied to the opening end (42a) of the inboard section (42) from the lubricating oil guide groove (15) flows into the tapered section (45) via the ledge (44) and then into the spiral oil groove (80) from the tapered section (45).

The lubrication structure for the differential device according to the present invention includes the above-mentioned tapered section on the inner diameter side of the ledge at the opening end of the inboard section of the differential case so that the lubricating oil supplied to the opening end of inboard section can flow from the ledge into the spiral oil groove via this tapered section. Namely, the inlet port of the spiral oil groove communicating to the opening end of the inboard section is tapered, slanting toward the inner diameter side of opening end and approaching the center of differential device, whereby the aperture area of a starting point of the spiral oil groove is enlarged. It enables to increase quantity of lubricating oil led into the spiral oil groove from the opening end of the inboard section and thus improve lubrication performance of differential device.

At the opening end of the inboard section in the conventional structure, no portion equivalent to the above-mentioned tapered section is provided on the inner diameter side of a portion equivalent to the above-mentioned ledge. Thus, a small amount of the lubricating oil which has been supplied to the opening end of the inboard section is led into the spiral oil groove from the ledge, while the rest of lubricating oil is considered to fall inside the transmission case from the opening end. In contrast, according to the present invention, the lubricating oil which has been supplied to the opening end of the inboard section can effectively flow into the spiral oil groove via the above-mentioned tapered section. Therefore, lubrication performance of each gear and shaft in the differential device can be improved.

The above-mentioned lubrication structure further includes a guide groove (46) installed at one end in the circumferential direction of the tapered section (45) and communicating to the spiral oil groove (80). The guide groove (46) should be formed so as to be gradually deeper toward the spiral oil groove (80) from the ledge (44) side.

According to this configuration, the above-mentioned guide groove can more effectively supply to the spiral oil groove the lubricating oil which has been led to the tapered section from the ledge. Also, even if a large amount of lubricating oil is led into the tapered section and the guide groove or the stream of lubricating oil is weak, the guide groove can infallibly guide such lubricating oil to the spiral oil groove since the guide groove is formed so as to be gradually deeper toward the spiral oil groove from the tapered section.

In addition, in the above-mentioned lubrication structure, a chamfered contour (47) in a slope shape slanting toward the inner diameter side of the opening end (42a) and approaching the center is formed on the inner diameter side of the end surface (43). The area of the chamfered contour (47) should be set smaller than that of the end surface (43).

According to this configuration, the lubricating oil which has flowed inside the inboard section from the opening end can be restrained from flowing out along the chamfered contour since the area of the chamfered contour formed on the inner diameter side of the end surface is set smaller than that of the end surface. Thus, lubrication performance of the differential device can be improved.

In addition, the above-mentioned lubrication structure which includes the bearing (22) supporting the circumference of the inboard section (42) is provided with a lubrication plate (24) for guiding to the opening end (42a) of the inboard section (42) the lubricating oil which has been led in between the bearing (22) and the oil seal (74) via the lubricating oil guide groove (15). Here, an end side (42d) on the outer diameter side of the opening end (42a) should be positioned farther from the bearing (22) in the axial direction than the position ($\alpha$) of the end face (24b) on the bearing (22) side at the end (24c) on the opening end (42a) side of the lubrication plate (24).

Alternatively, an end side (45a) on the outer diameter side of the tapered section (45) should be positioned farther from the bearing (22) in the axial direction than the position ($\alpha$) of the end face (24b) on the bearing (22) side at the end (24c) on the opening end (42a) side of the lubrication plate (24), and an end side (45b) on the inner diameter side of the tapered section (45) should be positioned closer to the bearing (22) in the axial direction than the position ($\alpha$) of the end face (24b) on the bearing (22) side at the end (24c) on the opening end (42a) side of the lubrication plate (24).

In the lubrication structure provided with the above-mentioned lubrication plate, due to pumping action caused by bearing rotation, the lubricating oil guided to the opening end of the inboard section via the lubrication plate may leak out (or be sucked out) from a gap between the end of the lubrication plate and the opening end of the inboard section. Due to that, there is a problem that the larger a gap between the end of the lubrication plate and the opening end of the inboard section is, the more lubricating oil leaks out from the above-mentioned gap and the less flow rate of lubricating oil is led into the inboard section. To solve such problem, a structure where the above-mentioned gap is as small as possible is desired. Therefore, in the configuration according to this invention, the opening end of the inboard section and the end of the lubrication plate should be positioned as described above. According to this configuration, the gap between the end of the lubrication plate and the opening end of the inboard section and the flow rate of the lubricating oil sucked out due to pumping action caused by bearing rotation can be restrained to be small, while avoiding the length in the axial direction of the inboard section from increasing. It can secure an efficient flow rate of lubricating oil to be led inside the inboard section, while avoiding upsizing of the differential device and securing free design layout to a certain extent. The reference numerals and symbols in the above parentheses represent the reference numerals and symbols used for structural elements in an embodiment which will be described later, as an example of the present invention.

Effects of the Invention

In the lubrication structure according to the present invention, lubricating oil can effectively flow from the opening end of the inboard section in the differential case into the spiral oil groove, enabling effective lubrication inside the differential device.

BRIEF DESCRIPTION OF THE DRAWINGS

FIG. 7 is perspective views showing an opening end of an inboard section, where

MODE FOR CARRYING OUT THE INVENTION

Figure 1:
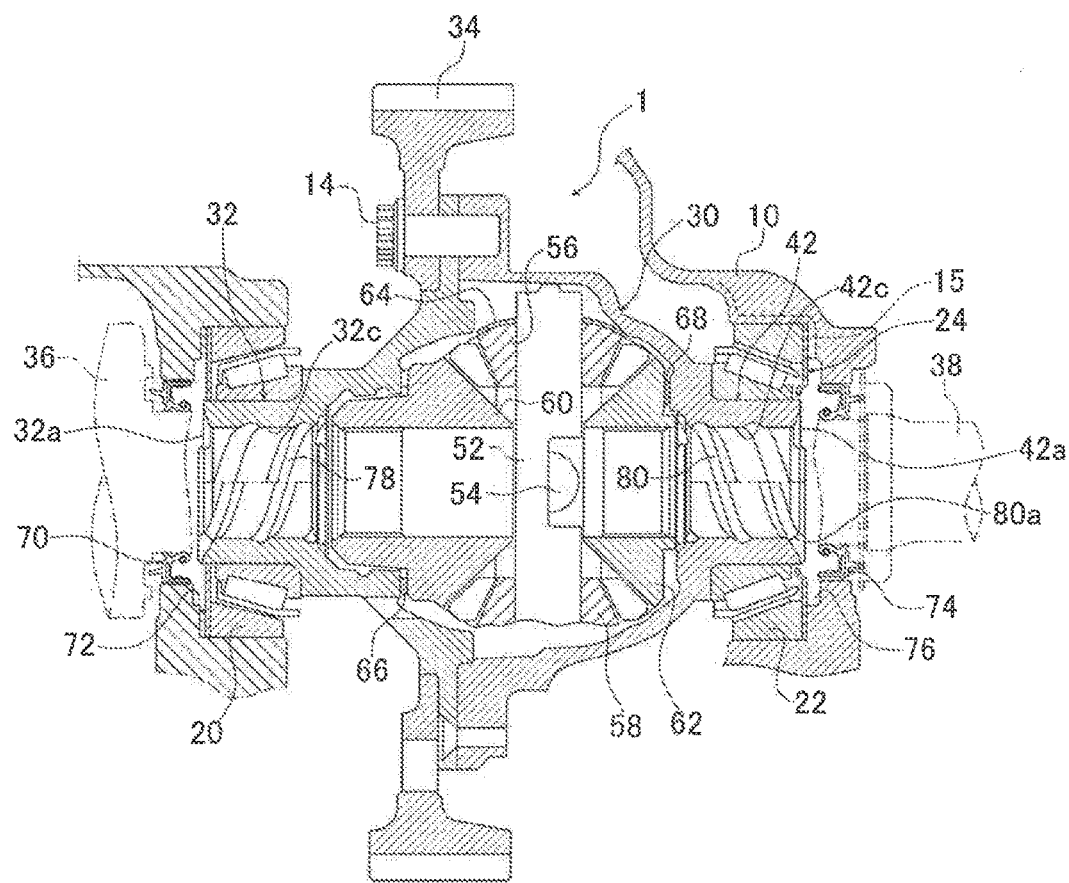
FIG. 1 is a sectional side view showing a differential device provided with a lubrication structure according to one embodiment of the present invention.

Hereinafter, an embodiment of the present invention will be described in detail with reference to the appending drawings. FIG. 1 is a sectional side view showing a differential device provided with a lubrication structure according to one embodiment of the present invention. It should be noted that a transmission case 10 is partially shown in the same figure. A differential device 1 includes a differential case 30 which is rotatably supported to a transmission case 10 via a pair of bearings 20, 22. A final driven gear 34 is fixed to the differential case 30 by a plurality of bolts 14 (only one bolt is herein illustrated).

The differential case 30 includes a pair of pipe-shaped inboard sections (or boss sections) 32, 42 extending in the horizontal direction of a vehicle body. Outer peripheral surfaces of the inboard sections 32, 42 are supported by inner races of the bearings 20, 22. The bearings 20, 22 are tapered-roller bearings provided with rollers whose axial direction is slanted to the axial direction of the inboard sections 32, 42. In addition, an end of a left axle 36 is rotatably supported along an inner circumference of the left inboard section 32, and an end of a right axle 38 is supported rotatably along an internal circumference of the right inboard section 42. It should be noted that axial direction in the following description refers to the axial directions of the left and right axles 36, 38.

In the differential case 30, a pair of pinion shafts 52, 54 perpendicular to each other is supported so as to be positioned between facing ends of the both axles 36, 38 and be perpendicular to axis lines of the both axles 36, 38. Each of the pinion shafts 52, 54 is fixed to the differential case 30 unrotatably and not so as to be inserted and extracted.

A pair of pinion gears (or differential pinions) 56, 58 is supported rotatably to the pinion shaft 52. Likewise, a pair of pinion gears (not illustrated in the figure) is supported rotatably to the pinion shaft 54. A pair of side gears (or drive pinions) 60, 62 respectively engaged to these pinion gears 56, 58 is spline-coupled respectively to the left and right axles 36, 38.

A thrust washer 4 in curved surface-shape is interposed between a back face of the pinion gear 56 and the differential case 30. Likewise, a thrust washer in curved surface-shape (not illustrated in the figure) is interposed between a back face of the pinion gear 58 and the differential case 30.

Likewise, a thrust washer in curved surface-shape is interposed between the differential case 30 and a back face of the pinion gear supported by the pinion shaft 54. Furthermore, planar thrust washers 66, 68 are interposed between the side gears 60, 62 and the differential case 30.

An annular groove (or an annular space) 72 is formed between the left bearing 20 and an oil seal 70 which is provided between the left axle 36 and the transmission case 10. Lubricating oil which has been pumped up by the final driven gear 34 and then dispersed is collected along a lubricating oil guide groove (not illustrated in the figure) provided on the inner surface of the transmission case 10, and then supplied into the annular groove 72.

Likewise, an annular groove (or annular space) 76 is formed between the right bearing 22 and an oil seal 74 which is provided between the right axle 38 and the transmission case 10. Lubricating oil which has been pumped up by the final driven gear 34 and then dispersed is collected along the lubricating oil guide groove 15 provided on the inner surface of the transmission case 10, and then supplied to the annular groove 76.

Figure 2:
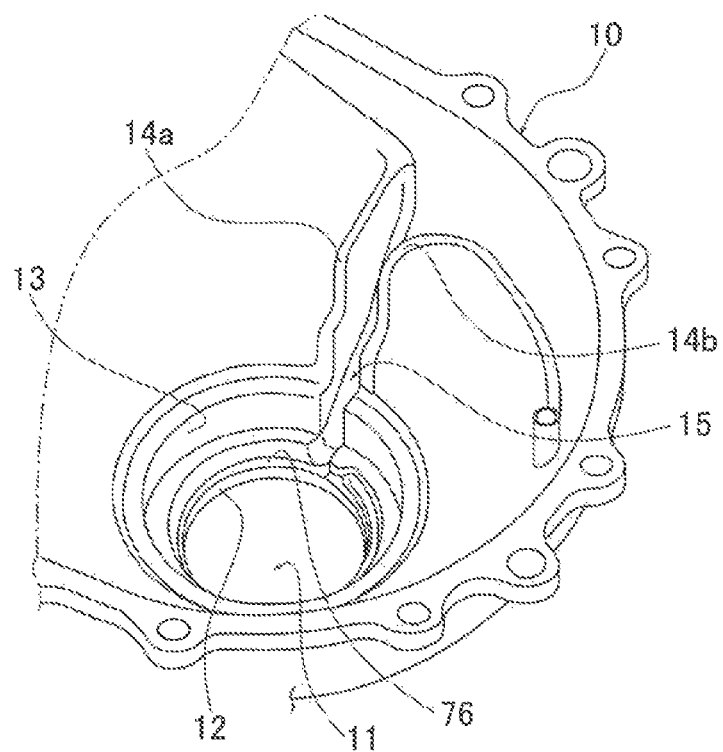
FIG. 2 is a perspective view showing a lubrication oil guide groove formed on the inner surface of a transmission case.

FIG. 2 is a perspective view of the lubricating oil guide groove 15 formed on the inner surface of the transmission case 10. As shown in the same figure, a circular opening 11 is formed where the right axle 38 of the transmission case 10 should be inserted. The oil seal 74 (ref. FIG. 1) is installed to an inner enclosure 12 defining the opening 11 of transmission case 10. In addition, a seat portion 13 to which an outer race of the bearing 22 will be attached is provided on the inner surface of the transmission case 10. And the lubricating oil guide groove 15 is provided between a pair of ribs 14a, 14b on the inner surface of the transmission case 10. This lubricating oil guide groove 15 is a groove for collecting the lubricating oil which has been pumped up by the final driven gear 34 and then hit against the inner surface of case 10, and then guiding such lubricating oil toward the annular groove 76 (or annular space) provided between the bearing 22 and the oil seal 74.

Figure 3:
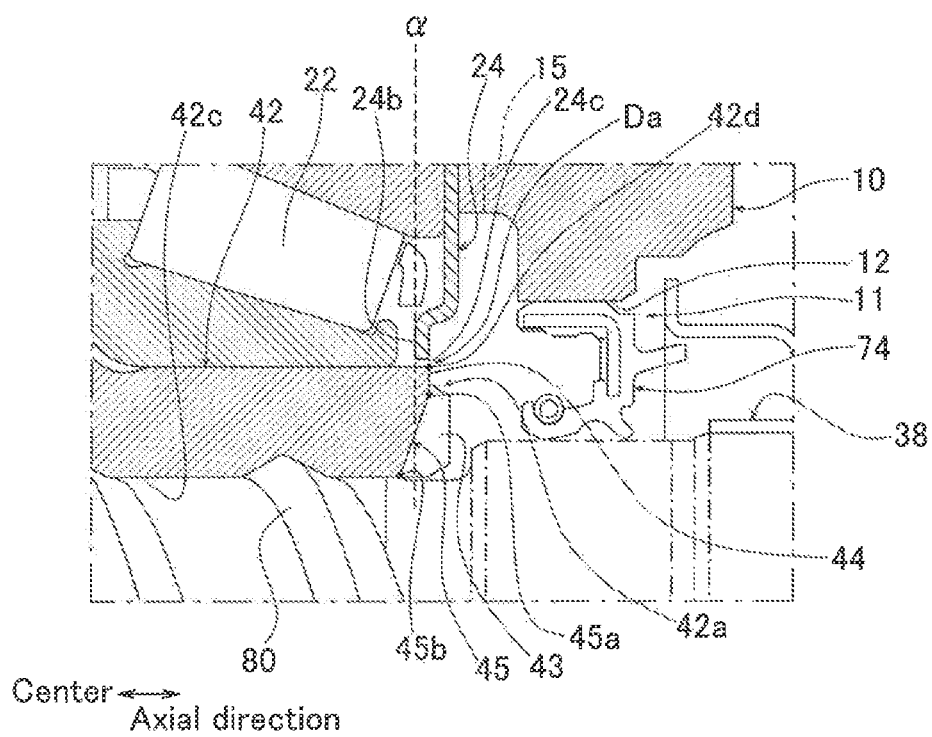
FIG. 3 is a partially-enlarged sectional side view showing part of an opening end of an inboard section and its periphery.

FIG. 3 is a partially-enlarged sectional side view showing part of the opening end 42a of the inboard section 42 and its periphery. As is shown in the same figure, a lubrication plate 24 is arranged on the outer diameter side of the opening end 42a of the inboard section 42 for guiding toward the opening end 42a of inboard section 42 the lubricating oil which has been led in between the bearing 22 and the oil seal 74 via the lubricating oil guide groove 15. This lubrication plate 24 is a substantially flat plate-shaped member having a circular ring shape. And the opening end 42a of the inboard section 42 is disposed inside a circular through-hole provided in the center of the lubrication plate 24. Therefore, an inner diameter side end 24c of the lubrication plate 24 (or an end on the side of the opening end 42a of the inboard section 42) is opposed with a slight gap to the outer diameter side of the opening end 42a of the inboard section 42. This lubrication plate 24 is installed adjacent to the bearing 22 in the axial direction (or opposite to or outer from the center of the differential device 1).

On an inner periphery 32c of the left inboard section 32, an oil groove 78 (or an spiral groove) is installed, spreading spirally from the end of the left inboard section 32 (or the opening end 32a) toward the center of the differential device 1, namely, toward inside the differential case 30. Likewise, on an inner periphery 42c of the right inboard section 32, an oil groove 80 (or an spiral groove) is installed, spreading spirally from the end of the right inboard section 32 (or the opening end 42a) toward the center of differential device 1, namely, toward inside the differential case 30.

Figure 4A:
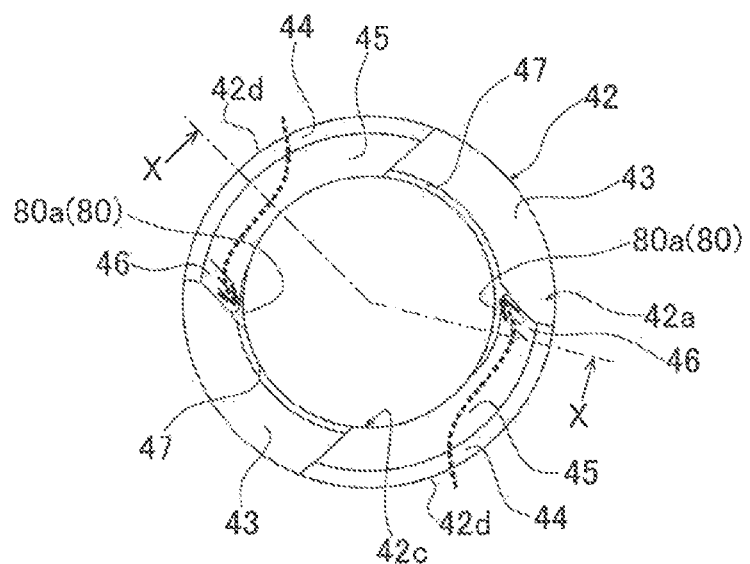
FIG. 4A is a view of an opening end of an inboard section as viewed from axial direction.
Figure 4B:
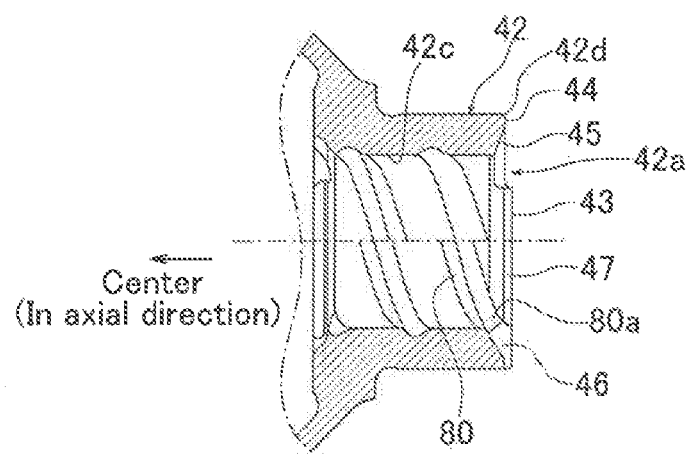
FIG. 4B is a view showing an X-X cross-section view of FIG. 4A.
Figure 5:
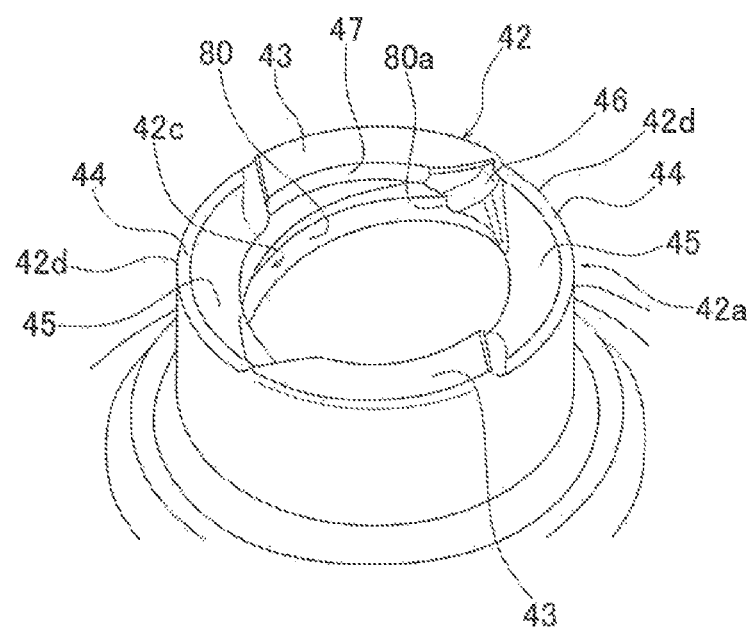
FIG. 5 is a perspective view showing an opening end of an inboard section.

A configuration of the opening end 42a of the inboard section 42 and its periphery will be described below in detail. In the following description, the right opening end 42a of the inboard section 42 and its periphery will be described. Such description can be partially applied as well to the left opening end 32a of the inboard section 32 and its periphery. FIG. 4A is a view of the opening end 42a of the inboard section 42 and its periphery as viewed from axial direction, and FIG. 4B is a view showing an X-X cross-section view of FIG. 4A. FIG. 5 is a perspective view of the opening end 42a of the inboard section 42.

As shown in FIGS. 4 and 5, the opening end 42a of the inboard section 42 is provided with an end surface 43 and a ledge 44, each of which consists of a plane perpendicular to the axial direction. The end surface 43 is composed of a plane perpendicular to the axial direction and farthest from the center of the differential device 1 (hereinafter referred to as the center) in the axial direction. The ledge 44 is a plane adjacent to the end surface 43 in the circumferential direction of the opening end 42a and closer to the center in the axial direction than such end surface 43. The end surface 43 and ledge 44 are provided alternately in the circumferential direction of the opening end 42a, totaling two end surfaces and two ledges.

In addition, on the inner diameter side of the ledge 44 at the opening end 42a, a tapered section 45 is formed continuing to the ledge 44. The tapered section 45 is formed in a slope shape, slanting toward the inner diameter side of the opening end 42a and approaching the center (or leaving from the opening end 42a). An end 80a of the spiral groove 80 formed on the inner periphery 42c of the inboard section 42 is opened on the inner diameter side at one end in the circumferential direction of the tapered section 45. Further, a guide groove 46 communicating to the end 80a of the spiral groove 80 is formed at one end in the circumferential direction of the tapered section 45. The guide groove 46 is composed of a linear concave of the surface of the tapered section 45, extending at one end of the tapered section 45 from the ledge 44 side toward the end 80a of the spiral groove 80. In addition, the guide groove 46 is formed to be gradually deeper from the ledge 44 side toward the end 80a of the spiral groove 80.

Further, a chamfered contour 47 in a slope shape slanting toward the inner diameter side at the opening end 42a and approaching the center is formed on the inner diameter side of the end surface 43 at the opening end 42a. An area of the chamfered contour 47 is set smaller than an area of the adjacent end surface 43.

Also, as shown in FIG. 3, an end side 42d on the outer diameter side at the opening end 42a of the inboard section 42 is positioned farther from the bearing 22 (in the axial direction) (or positioned on the outer side from the center of the differential device 1) than the position α of the end face 24b on the bearing 22 side at the inner diameter side end 24c of the lubrication plate 24. In addition, in the configuration example shown in FIG. 3, the end side 42d on the outer diameter side at the opening end 42a and the ledge 44 continuing inward therefrom are on the same position in the axial direction. Therefore, in the example shown in the figure, the ledge 44 is positioned farther from the bearing 22 in the axial direction than the position α of the end face 24b of the lubrication plate 24.

Furthermore, an end side 45a on the outer diameter side of the tapered section 45 (or an end side 45a continuing to the inner diameter side of the ledge 44) is positioned farther (or outer) from the bearing 22 (in the axial position) than the position α of the end face 24b on the bearing 22 side at the inner diameter side end 24c of the lubrication plate 24. And, an end side 45b of the inner diameter side of the tapered section 45 is positioned closer (or inner) to the bearing 22 than the position α of the end face 24b of the lubrication plate 24. In other words, the position α of the end face 24b (or the inner surface) of the lubrication plate 24 is positioned between the end side 45a on the outer diameter side of the tapered section 45 and the end side 45b on the inner diameter side thereof in the axial direction.

According to the lubrication structure of the present embodiment, the lubricating oil which has been pumped up by the final driven gear 34 within the transmission case 10 flows into the annular groove 76 through between the bearing 22 and the oil seal 74 from the lubricating oil guide groove 15 installed on the inner surface of the transmission case 10. Then, from the annular groove 76, the lubricating oil is guided by the lubrication plate 24 (or along the surface of the lubrication plate 24) and supplied to the opening end 42a of the inboard section 42. The lubricating oil which has been supplied to the opening end 42a of the inboard section 42 in this way flows into the tapered section 45 through the ledge 44 at the opening end 42a, as indicated by the arrow in FIG. 4A, and then flows into the spiral groove 80 from the tapered section 45 along the guide groove 46.

The lubrication structure provided by the differential device 1 of the present embodiment is structured so that the lubricating oil which has been supplied to the opening end 42a of the inboard section 42 can flow into the spiral groove 80 from the ledge 44 via the above-mentioned tapered section 45 installed on the inner diameter side of the ledge 44 at the opening end 42a of the inboard section 42 of the differential case 30. In other words, an inlet port of the spiral groove 80 communicating to the opening end 42a of the inboard section 42 is tapered, slanting toward the inner diameter side of the opening end 42a and approaching the center of the differential device 1, whereby an aperture area of the starting point of the spiral groove 80 is enlarged. This allows to increase the amount of lubricating oil led into the spiral groove 80 from the opening end 42a of the inboard section 42 and improve lubrication performance of the differential device 1.

It should be noted that with respect to the opening end 42a of the inboard section 42 in the conventional structure, any part equivalent to the above-mentioned tapered section 45 is not provided on the inner diameter side of a part equivalent to the above-mentioned ledge 44. Therefore, it is considered that a small amount from the lubricating oil which has been supplied to the opening end 42a of the inboard section 42 can be led into the spiral groove 80 from the ledge 44, and the rest of the lubricating oil falls inside the same transmission case 10 from the opening end 42a, without being led into the spiral groove 80. In contrast, in the present embodiment, the above-mentioned tapered section 45 enables the lubricating oil which has been supplied to the opening end 42a of the inboard section 42 to effectively flow into the spiral groove 80, thereby improving lubrication performance of each gear and shaft in the differential device 1.

In addition, the lubrication structure of the present embodiment is provided with the guide groove 46 communicating to the spiral groove 80 installed at one end in the circumferential direction of the tapering portion 45. This guide groove 46 can more effectively supply to the spiral groove 80 the lubricating oil which has been led to the tapered section 45 from the ledge 44. Further, this guide groove 46 is formed to be gradually deeper from the tapered section 45 to the spiral groove 80. Thus, even if a large amount of lubricating oil is led into the tapered section 45 and the guide groove 46, or the stream of lubricating oil is weak, the guide groove 46 can infallibly guide the lubricating oil to the spiral groove 80.

Figure 6:
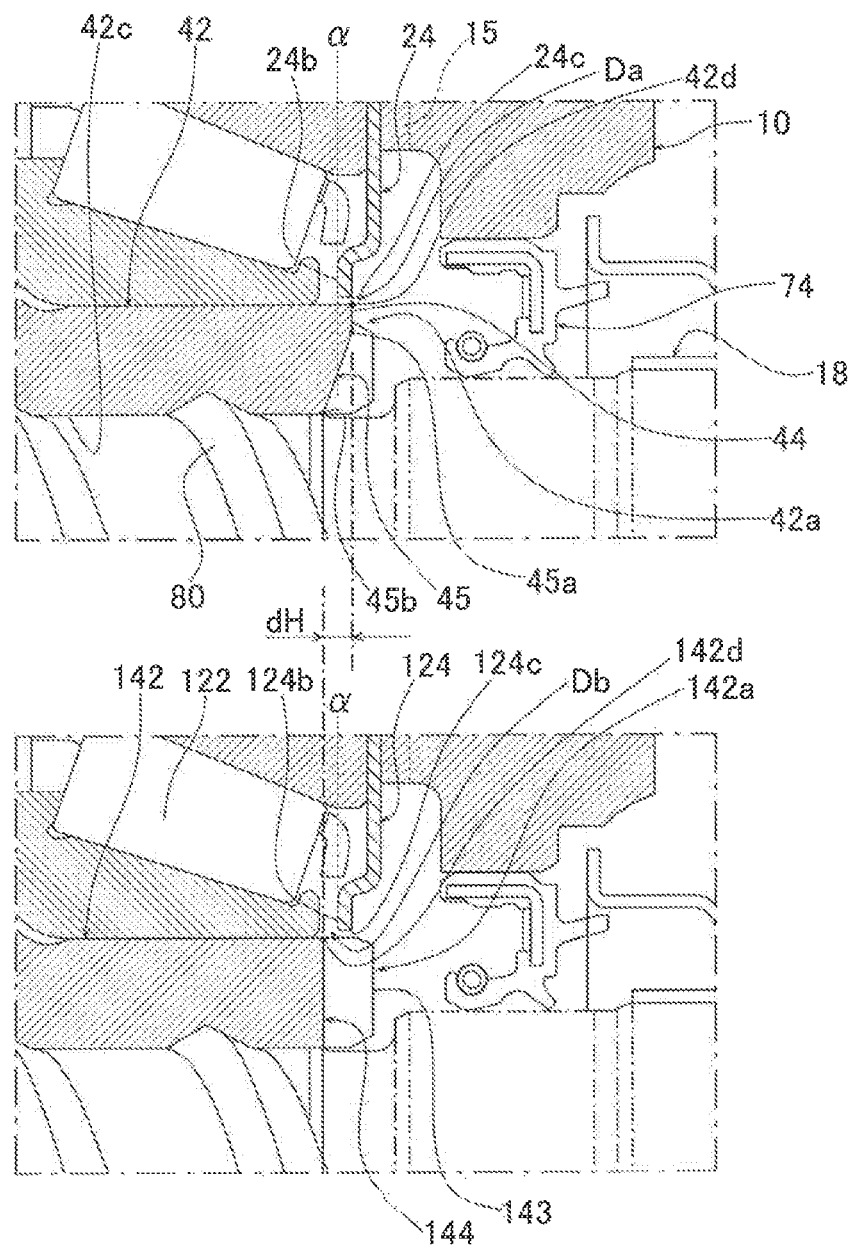
FIG. 6 is a partially-enlarged sectional side view showing part of an opening end of an inboard section.

FIG. 6 is partially-enlarged sectional side views showing parts of an opening end of an inboard section, where FIG. 6A illustrates the opening end 42a of the inboard section 42 in the differential device 1 of the present embodiment, while FIG. 6B illustrates an opening end 142a of the inboard section 142 in a differential device of the conventional structure. The opening end 142a of the inboard section 142 in the conventional structure is provided with an end surface 143 and a ledge 144 respectively corresponding to the end surface 43 and the ledge 44 of the present embodiment. As shown in the same figure, in the present embodiment, the tapered section 45 with the above-mentioned configuration is provided on the inner diameter side of the ledge 44 at the opening end 42a of the inboard section 42. Here, the ledge 44 is positioned higher (or farther from the center) than the ledge 144 at the opening end 142a in the conventional structure without the tapered section 45. In other words, in the present embodiment, the ledge 44 is positioned farther from the center in the axial direction by dimension dH than the conventional structure. Thus, the ledge 44 is positioned higher than the conventional structure (in the axial direction), thereby enabling to restrain leakage of lubricating from the ledge 44. Consequently, lubrication performance of each gear in the differential device 1 can be improved.

In addition, as shown in FIG. 6B, in the conventional lubrication structure, an end side 142c on the outer diameter side of the opening end 142a and the ledge 144 are inner (or closer to the bearing 122) than the position α of an end face 124b of a lubrication plate 124. This leads to the problem that gap Db between the opening end 142a of the inboard section 142 and the inner diameter side end 124c of the lubrication plate 124 is large, resulting in a large flow amount (or leaking amount) of lubricating oil sucked out via such gap Db due to pumping action of the bearing 122.

In contrast, in the lubrication structure of the present embodiment, as shown in FIG. 6A, the end side 42d on the outer diameter side of the opening end 42a and the ledge 44 are positioned outer (or farther from the bearing 122) (in the axial direction) than the position α of the end face 24b of the lubrication plate 24. Also, the end side 45a on the outer diameter side of the tapered section 45 is positioned outer than the position α of the end face 24b of the lubrication plate 24, and the end side 45b on the inner diameter side of the tapered section 45 is positioned inner than the position α of end face 24b of the lubrication plate 24. This can restrain gap Da between the inner diameter side end 24c of the lubrication plate 24 and the opening end 42a of the inboard section 42 to be small, while keeping axial length of the inboard section 42 comparable to that of the conventional structure. Therefore, flow rate of lubricating oil leaking out to the bearing 22 side via such gap Da due to pumping action along with rotation of the bearing 22 can be restrained to be small.

It should be noted that if the ledge 144 of the conventional structure as shown in FIG. 6B is positioned outer than the position α of the end face 124b of the lubrication plate 124, the inboard section 142 will be long in axial direction. It leads to upsizing of the differential device and less flexibility of layout.

Figure 7A:
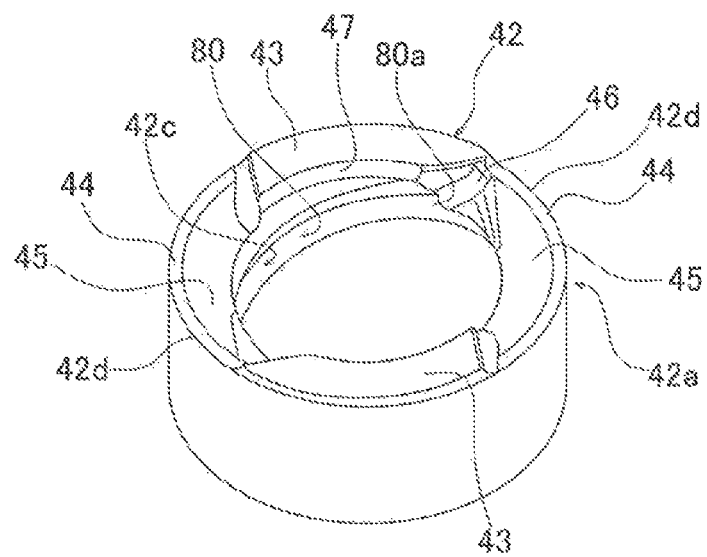
FIG. 7A is a view showing an opening end according to the present embodiment.
Figure 7B:
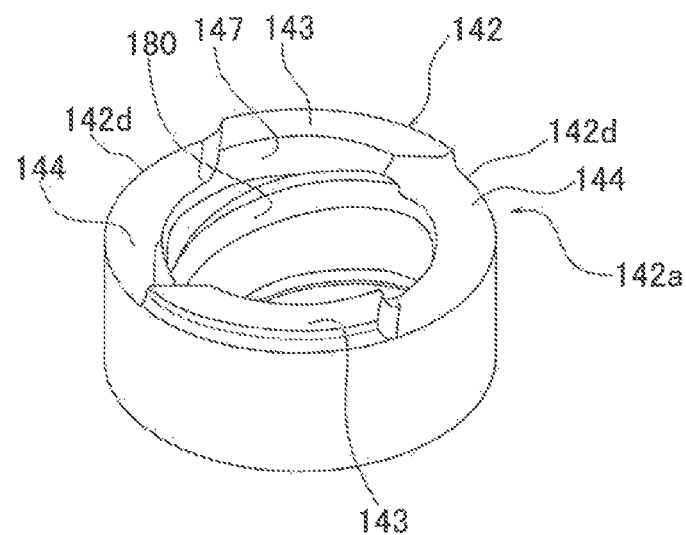
FIG. 7B is a view showing an opening end of the conventional structure.
Figure 8A:
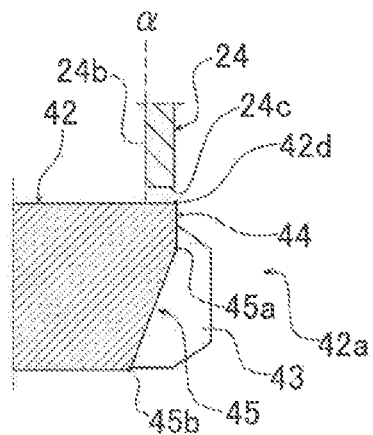
FIGS. 8A-8F are views showing a configuration example of an opening end of an inboard section.
Figure 8B:
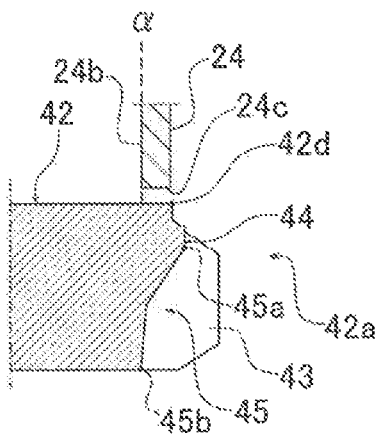
Figure 8C:
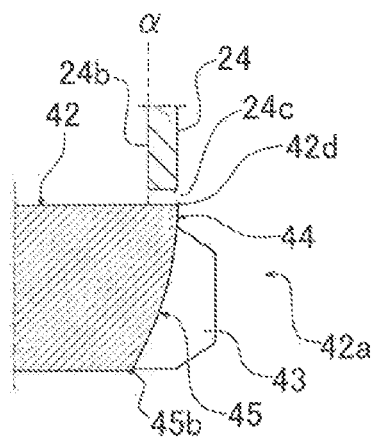
Figure 8D:
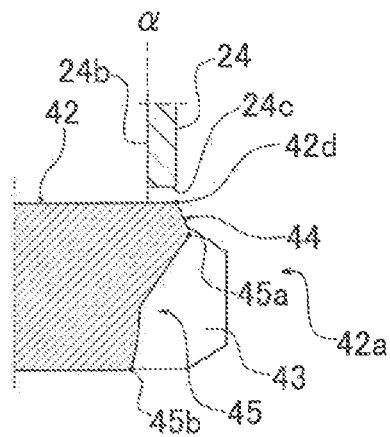
Figure 8E:
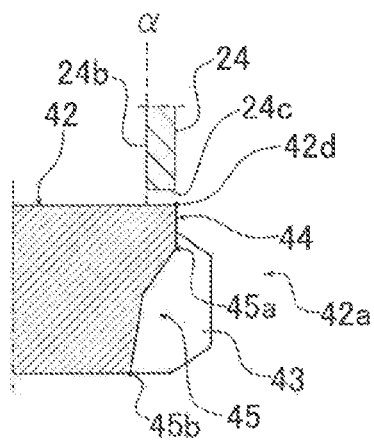
Figure 8F:
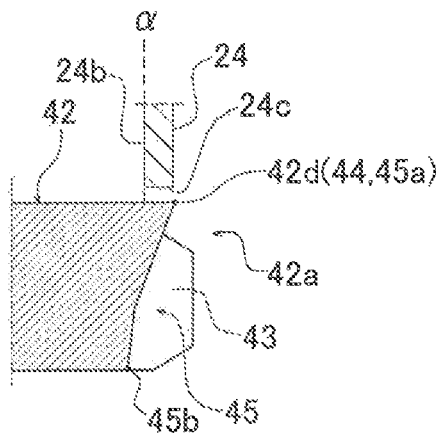

FIG. 7 is perspective views of an opening end of an inboard section, where FIG. 7A is a view showing the opening end 42a of the inboard section 42 in the differential case 1 of the present embodiment, and FIG. 7A is a view showing the opening end 142a of the inboard section 142 of the conventional structure. The inboard part 142 of the conventional structure is provided with a spiral groove 180 corresponding to the spiral groove 80 of the present embodiment, and the opening end 142a is provided with a chamfered contour 147 corresponding to the chamfered contour 47 of the present embodiment. As is evident from comparison between FIG. 7A and FIG. 7A, in the differential device 1 of the present embodiment, the area of the chamfered contour 47 installed at the opening end 42a of the inboard section 42 is made smaller than that of the chamfered contour 147 of the conventional structure. In other words, viewing from the axial direction, part of the chamfered contour 147 of the conventional structure is changed to the end surface 43, resulting in an enlarged area the end surface 43. Thus, the area of the chamfered contour 47 is made smaller than that of the conventional structure, allowing to reduce the amount of lubricating oil leaking out via the chamfered contour 47 from inside the inboard section 42. Consequently, lubrication performance of each gear in the differential device 1 can be improved. It should be noted that in the present embodiment, the area of the chamfered contour 47 is set smaller than that of the end surface 43.

The lubrication structure of the present embodiment can ensure both of enlargement of an aperture area of the opening end 42a in order to properly lead the lubricating oil, which has been supplied to the opening end 42a of the inboard section 42, to inside the inboard section 42 and restraint of flow rate (or leaking amount) of the lubricating oil leaking out into the transmission case 10 due to pumping action of the bearing 22 via gap Da between the lubrication plate 24 and the opening end 42a of the inboard section 42, while avoiding upsizing of the differential device 1 (or the inboard section 42) in the axial direction.

FIG. 8 is views showing configuration examples of the opening end 42a of the inboard section 42. The ledge 44 and the tapered section 45 installed at the opening end 42a of the inboard section 42 may be, as shown in FIG. 8A, respectively composed of a plane continuing to the end side 42d on the outer diameter side of the opening end 42a (or a plane perpendicular to the axial direction) and a plane linearly slanting from the ledge 44 toward the inner diameter side. Also, as shown in FIG. 8B, they may be respectively composed of a plane including the end side 42d on the outer diameter side of the opening end 42a and another uneven plane and a plurality of slant planes at different angles of inclination from the ledge 44 to the inner diameter side. Also, as shown in FIG. 8C, they may be composed in the way that the whole inside from the end side 42d on the outer diameter side of the opening end 42a is a curved slope consisting of the ledge 44 and the tapered section 45 without any boundary in between. Also, as shown in FIG. 8D, they may be respectively composed of a plane slanting outward in the axial direction from the end side 42d on the outer diameter side of the opening end 42a and a plurality of slant planes at different angles of inclination from the ledge 44 to the inner diameter side. Also, as shown in FIG. 8E, they may be respectively composed of a plane continuing to the end side 42d on the outer diameter side of the opening end 42a (or a plane perpendicular to the axial direction) and a plurality of slant planes at different angles of inclination from the ledge 44 to the inner diameter side. Also, as shown in FIG. 8F, they may be respectively composed of only the end side 42d on the outer diameter side of the opening end 42a and the whole of the inner diameter side from the ledge 44 including a plurality of slant planes at different angles of inclination.

Whichever shape as shown FIGS. 8A to 8F the opening end 42a of the inboard section 42 has, the end side 42d on the outer diameter side of the opening end 42a should be positioned farther from the bearing 22 (in the axial direction) than the position α of the end face 24b of the lubrication plate 24. Further, the end side 45a on the outer diameter side of the tapered section 45 should be positioned farther (or outer) from the bearing 22 than the position α of the end face 24b of the lubrication plate 24, and the end side 45b on the inner diameter side of the tapered section 45 should be positioned closer (or inner) to the bearing 22 than the position α of the end face 24b of the lubrication plate 24.

Although the embodiment of the present invention has been described above, the present invention is not limited to the above embodiment. Various modifications can be made in a scope of the technical idea described in the following claims, the specification described above and the accompanying drawings without departing from the spirit and scope of the present invention. The specific shapes, dimensions and positions of each part (such as the end surface 43, the ledge 44, the tapered section 45, the chamfered contour 47, etc.) included in the opening end 42a of the inboard section 42 as shown in the above embodiment are suggested by way of example. Hence, other shapes, dimensions and positions than those of the foregoing embodiment may be adopted as far as they are within the scope of the present invention.

In addition, the specific shape of the lubrication plate 24 as shown in the above embodiment is one example thereof. The lubrication plate 24 may have another shape than that illustrated in the figures. For example, while the lubrication plate 24 shown in each of the above figures is uneven in the middle in diameter direction, it may be even. Further, the end on the inner diameter side of the lubrication plate may be bent inward in axial direction (or toward the bearing 22), which is not illustrated in figure.

The invention claimed is:

1. A lubrication structure for a differential device including a differential case rotatably disposed inside a transmission case and having an inboard section rotatably supporting an axle, and a final driven gear on the differential case, the lubrication structure comprising:
   a bearing rotatably supporting the differential case to the transmission case;
   an oil seal between the transmission case and the axle;
   a lubrication oil guide groove on an inner surface of the transmission case, the lubrication oil guide groove communicating between the bearing and the oil seal; and
   a spiral oil groove on an inner periphery of the inboard section from an opening end of the inboard section toward a center in an axial direction of the differential device,
   wherein lubrication oil pumped up in the transmission case by the final driven gear and then flowed from the lubrication oil guide groove in between the bearing and the oil seal is supplied from the opening end of the inboard section to the spiral oil groove,
   wherein the opening end of the inboard section comprises:
   an end surface perpendicular to the axial direction at a position farthest from the center in the axial direction;
   a ledge positioned closer to the center in the axial direction than the end surface at a position adjacent to the end surface in a circumferential direction of the opening end; and
   a tapered section continuing to an inner diameter side of the ledge of the opening end, slanting toward an inner diameter side of the opening end and approaching the center, and
   wherein lubrication oil supplied from the lubrication oil guide groove to the opening end of the inboard section flows via the ledge to the tapered section and then from the tapered section into the spiral oil groove.

2. The lubrication structure for the differential device according to claim 1, the lubrication structure further comprising:
   a guide groove disposed at one end in a circumferential direction of the tapered section and communicating to the spiral oil groove,
   wherein the guide groove is formed gradually deeper from the ledge toward the spiral groove.

3. The lubrication structure for the differential device according to claim 2,
   wherein an inner diameter side of the end surface comprises a chamfered contour in a slope shape, the chamfered contour slanting toward the inner diameter side of the opening end and approaching the center, and
   wherein an area of the chamfered contour is set smaller than an area of the end surface.

4. The lubrication structure for the differential device according to claim 2 comprising:
   a lubrication plate configured to guide lubrication oil guided in between the bearing, supporting an circumference of the inboard section, and the oil seal via the lubricating oil guide groove to the opening end of the inboard section,
   wherein an end side on an outer diameter side of the opening end is positioned farther from the bearing in the axial direction than an end face on a bearing side at an end of the lubrication plate on an opening end side.

5. The lubrication structure for the differential device according to claim 2 comprising:
   a lubrication plate configured to guide lubrication oil guided in between the bearing, supporting a circumference of the inboard section, and the oil seal via the lubricating oil guide groove to the opening end of the inboard section,
   wherein an end side on an outer diameter side of the tapered section is positioned farther from the bearing in the axial direction than an end face on a bearing side at an end of the lubrication plate on an opening end side, and
   wherein an end side on an inner diameter side of the tapered section is positioned closer to the bearing in the axial direction than the end face on the bearing side at the end of the lubrication plate on the opening end side.

6. The lubrication structure for the differential device according to claim 1,
   wherein an inner diameter side of the end surface comprises a chamfered contour in a slope shape, the chamfered contour slanting toward the inner diameter side of the opening end and approaching the center, and
   wherein an area of the chamfered contour is set smaller than an area of the end surface.

7. The lubrication structure for the differential device according to claim 6 comprising:
   a lubrication plate configured to guide lubrication oil guided in between the bearing, supporting an circumference of the inboard section, and the oil seal via the lubricating oil guide groove to the opening end of the inboard section,
   wherein an end side on an outer diameter side of the opening end is positioned farther from the bearing in the axial direction than an end face on a bearing side at an end of the lubrication plate on an opening end side.

8. The lubrication structure for the differential device according to claim 6 comprising:
   a lubrication plate configured to guide lubrication oil guided in between the bearing, supporting a circumference of the inboard section, and the oil seal via the lubricating oil guide groove to the opening end of the inboard section,
   wherein an end side on an outer diameter side of the tapered section is positioned farther from the bearing in the axial direction than an end face on a bearing side at an end of the lubrication plate on an opening end side, and
   wherein an end side on an inner diameter side of the tapered section is positioned closer to the bearing in the axial direction than the end face on the bearing side at the end of the lubrication plate on the opening end side.

9. The lubrication structure for the differential device according to claim 1 comprising:
   a lubrication plate configured to guide lubrication oil guided in between the bearing, supporting an circumference of the inboard section, and the oil seal via the lubricating oil guide groove to the opening end of the inboard section,
   wherein an end side on an outer diameter side of the opening end is positioned farther from the bearing in the axial direction than an end face on a bearing side at an end of the lubrication plate on an opening end side.

10. The lubrication structure for the differential device according to claim 1 comprising:
    a lubrication plate configured to guide lubrication oil guided in between the bearing, supporting a circumference of the inboard section, and the oil seal via the lubricating oil guide groove to the opening end of the inboard section, wherein an end side on an outer diameter side of the tapered section is positioned farther from the bearing in the axial direction than an end face on a bearing side at an end of the lubrication plate on an opening end side, and wherein an end side on an inner diameter side of the tapered section is positioned closer to the bearing in the axial direction than the end face on the bearing side at the end of the lubrication plate on the opening end side.

* * * * *